US012756200B2

United States Patent
(12) United States Patent
Hawes et al.

(10) Patent No.: US 12,756,200 B2
(45) Date of Patent: Oct. 6, 2026

(54) SYSTEMS AND METHODS FOR CONTROL OF A MEDIUM VOLTAGE DIRECT CURRENT SOLAR PLANT

(71) Applicant: GE Grid Solutions LLC, Atlanta, GA (US)

(72) Inventors: Nathaniel Benedict Hawes, Niskayuna, NY (US); Owen Schelenz, Berlin (DE); Siddharth Pant, Pittsburgh, PA (US)

(73) Assignee: GE GRID SOLUTIONS, LLC, Atlanta, GA (US)

( * ) Notice: Subject to any disclaimer, the term of this patent is extended or adjusted under 35 U.S.C. 154(b) by 125 days.

(21) Appl. No.: 18/755,373

(22) Filed: Jun. 26, 2024

(65) Prior Publication Data

US 2025/0007292 A1 Jan. 2, 2025

Related U.S. Application Data

(60) Provisional application No. 63/510,515, filed on Jun. 27, 2023.

(51) Int. Cl.
*H02J 3/38* (2026.01)
*H02J 1/102* (2026.01)
*H02J 101/24* (2026.01)

(52) U.S. Cl.
CPC .............. *H02J 3/381* (2013.01); *H02J 1/102* (2013.01); *H02J 2101/25* (2026.01); *Y02E 10/56* (2013.01)

(58) Field of Classification Search
CPC ........ H02J 3/38-50; H02J 1/102; H02J 1/106; H02J 2300/24-26; Y02E 10/56
See application file for complete search history.

(56) References Cited

U.S. PATENT DOCUMENTS

| | | | | |
|---|---|---|---|---|
| 9,525,284 B2 | 12/2016 | Kim et al. | | |
| 10,256,732 B2 | 4/2019 | Zhou et al. | | |
| 10,348,093 B2 | 7/2019 | Suryanarayana et al. | | |
| 10,971,934 B2 | 4/2021 | Majumder et al. | | |
| 2011/0273022 A1* | 11/2011 | Dennis ...................... | H02J 7/34 307/72 | |

(Continued)

OTHER PUBLICATIONS

PCT International Search Report and Written Opinion for Application No. PCT/US2024/035595 mailed Dec. 12, 2024; 15 pp.

*Primary Examiner* — Rexford N Barnie
*Assistant Examiner* — David A Shiao
(74) *Attorney, Agent, or Firm* — Armstrong Teasdale LLP

(57) ABSTRACT

A solar power generation system is provided. The solar power generation system includes a direct current (DC) to DC converter electrically coupled to a medium voltage DC (MVDC) bus and configured to convert LVDC to MVDC power, determine a voltage of the MVDC bus, and, in response to the determined voltage exceeding a threshold output voltage, transmit the MVDC power via the MVDC bus at a DC power level less than a rated DC output power level of the DC to DC converter. The solar power generation system further includes an inverter configured to convert the MVDC power to medium voltage AC (MVAC) power, determine the voltage of the received MVDC power, and, in response to the determined voltage being less than a threshold input voltage, transmit the MVAC power at an AC power level less than a rated AC output power level of the inverter.

17 Claims, 9 Drawing Sheets

(56) References Cited

U.S. PATENT DOCUMENTS

| | | | | |
|---|---|---|---|---|
| 2012/0091810 | A1* | 4/2012 | Aiello | H02J 1/102 307/64 |
| 2012/0205974 | A1 | 8/2012 | McCaslin et al. | |
| 2012/0299386 | A1* | 11/2012 | Kaufman | G05F 3/08 323/311 |
| 2012/0319494 | A1* | 12/2012 | Ecrabey | H02J 3/381 307/82 |
| 2013/0328403 | A1* | 12/2013 | Kaufman | H02J 3/46 307/77 |
| 2014/0285010 | A1* | 9/2014 | Cameron | H02J 7/35 307/29 |
| 2015/0318705 | A1 | 11/2015 | Lucas et al. | |
| 2018/0166881 | A1* | 6/2018 | Suryanarayana | H02J 3/381 |
| 2019/0140475 | A1 | 5/2019 | Chan et al. | |
| 2019/0326752 | A1* | 10/2019 | Kikuchi | H02J 3/38 |
| 2021/0288504 | A1* | 9/2021 | Horio | H02J 3/381 |
| 2023/0084081 | A1* | 3/2023 | Knobloch | H02J 3/32 307/82 |
| 2024/0275176 | A1 | 8/2024 | Rosado et al. | |

* cited by examiner

SYSTEMS AND METHODS FOR CONTROL OF A MEDIUM VOLTAGE DIRECT CURRENT SOLAR PLANT

CROSS-REFERENCE TO RELATED APPLICATIONS

This application claims the benefit of priority of U.S. Provisional Application No. 63/510,515, filed Jun. 27, 2023, and entitled "SYSTEMS AND METHODS FOR CONTROL OF A MEDIUM VOLTAGE DIRECT CURRENT SOLAR PLANT," the contents and disclosures of which are hereby incorporated by reference in their entirety.

BACKGROUND

The field of the disclosure relates generally to power generation facilities, and more particularly, to control of a solar power generation facility.

A solar field may be vast, covering many square kilometers, and solar plants may include hundreds of power conversion devices spread throughout the solar field. These power converters must coordinate their actions to regulate, for example, voltage within power transmission busses of the solar plant. For example, the power converters require a fast transient response capability to prevent transient over- and/or under-voltage conditions. A separate communication system may be used to coordinate operation of the power converters. However, due to the size of the solar field and distance between power converters, such communication systems are generally costly. A method of operating the solar plant to regulate voltage while retaining fast transient response capability is therefore desirable.

BRIEF DESCRIPTION

In one aspect, a solar power generation system is provided. The solar power generation system includes at least one photovoltaic (PV) array configured to generate low voltage direct current (LVDC) power. The solar power generation system further includes at least one DC to DC converter electrically coupled to a medium voltage DC (MVDC) bus and configured to convert LVDC power received from the at least one PV array to MVDC power, determine a voltage of the MVDC bus, and, in response to the determined voltage exceeding a threshold output voltage, transmit the MVDC power via the MVDC bus at a DC power level less than a rated DC output power level of the at least one DC to DC converter. The solar power generation system further includes at least one inverter configured to receive the MVDC power from the at least one DC to DC converter, convert the MVDC power to medium voltage AC (MVAC) power, determine the voltage of the received MVDC power, and, in response to the determined voltage being less than a threshold input voltage, transmit the MVAC power at an AC power level less than a rated AC output power level of the at least one inverter.

In another aspect, a method for controlling a solar power generation system is provided. The solar power generation system includes at least one DC to DC converter and at least one inverter, the at least one DC to DC converter electrically coupled to a MVDC bus. The method includes converting, by the at least one DC to DC converter, LVDC power received from at least one PV array to MVDC power. The method further includes determining, by the at least one DC to DC converter, a voltage of the MVDC bus. The method further includes in response to the determined voltage exceeding a threshold output voltage, transmitting, by the at least one DC to DC converter, the MVDC power via the MVDC bus at a DC power level less than a rated DC output power level of the at least one DC to DC converter. The method further includes receiving, by the inverter, the MVDC power from the at least one DC to DC converter. The method further includes converting, by the inverter, the MVDC power to MVAC power. The method further includes determining, by the inverter, the voltage of the received MVDC power. The method further includes in response to the determined voltage being less than a threshold input voltage, transmitting, by the inverter, the MVAC power at an AC power level less than a rated AC output power level of the inverter.

In another aspect, a solar power distribution system is provided. The solar power distribution system includes at least one DC to DC converter electrically coupled to an MVDC bus and configured to convert LVDC power received from at least one PV array to MVDC power, determine a voltage of the MVDC bus, and, in response to the determined voltage exceeding a threshold output voltage, transmit the MVDC power via the MVDC bus at a DC power level less than a rated DC output power level of the at least one DC to DC converter. The solar power distribution system further includes at least one inverter configured to receive the MVDC power from the at least one DC to DC converter, convert the MVDC power to MVAC power, determine the voltage of the received MVDC power, and, in response to the determined voltage being less than a threshold input voltage, transmit the MVAC power at an AC power level less than a rated AC output power level of the at least one inverter.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
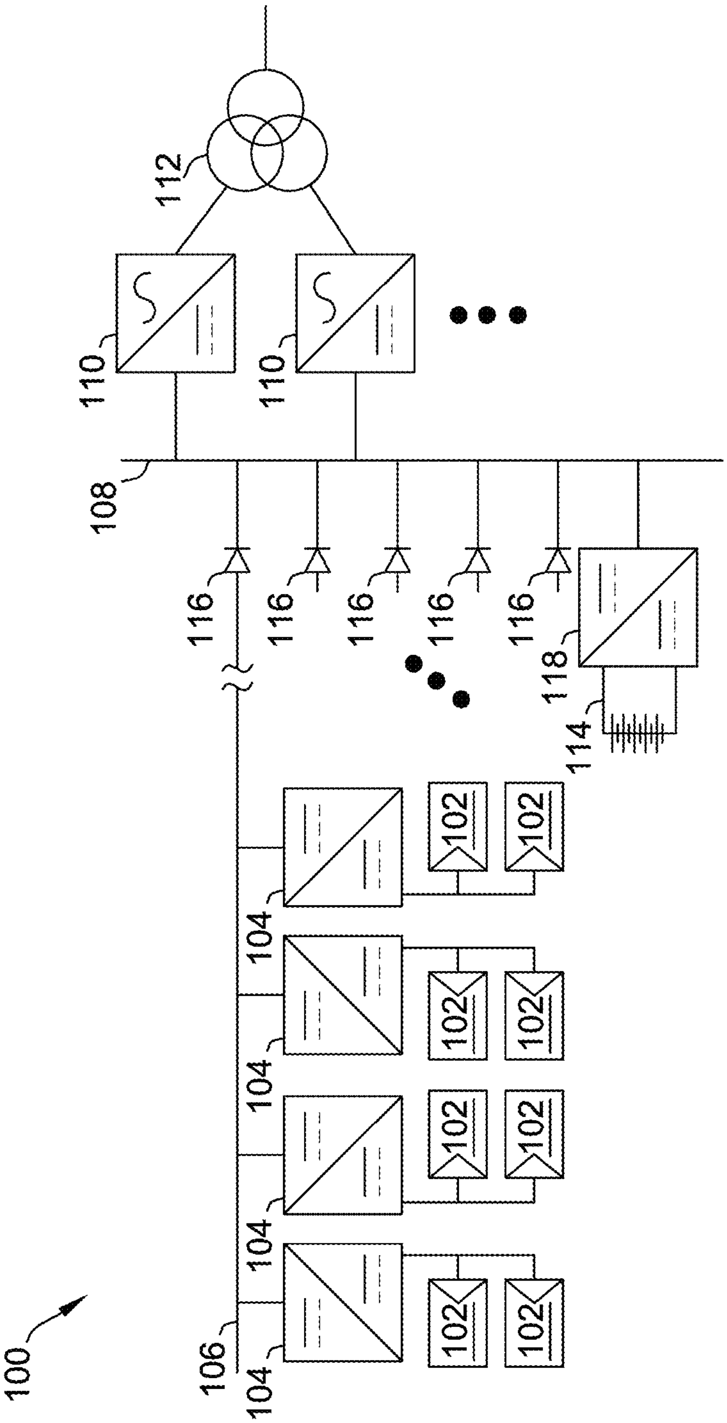
FIG. 1 is a diagram of an example solar power generation system.

In the following specification and the claims, reference will be made to a number of terms, which shall be defined to have the following meanings.

The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure include a solar power generation system. The solar power generation system includes at least one DC to DC converter coupled to a medium voltage DC (MVDC) bus. The DC to DC converter is configured to receive low voltage DC (LVDC) power from one or more photovoltaic (PV) arrays and convert the LVDC power to MVDC power having a higher voltage than the LVDC power. The DC to DC converter is further configured to measure a voltage of the MVDC bus, for example, to determine is a transient over- or under-voltage condition is occurring (i.e., the actual voltage of the MVDC bus is different than a nominal or desired MVDC voltage). If the measured voltage exceeds a threshold DC voltage, the DC to DC converter is configured to transmit the MVDC power via the MVDC bus at a DC power level less than a rated DC output power level of the DC to DC converter. In other words, while the DC to DC converter is configured to operate at the rated DC output power level under normal conditions, the DC to DC converter may operate at a reduced DC to DC output power level during over-voltage conditions to stabilize and/or reduce the MVDC voltage.

The solar power generating system further includes at least one inverter configured to receive the MVDC power from the at least one DC to DC converter and convert the MVDC power to medium voltage AC (MVAC) power, which may then be supplied to a grid or load (e.g., via a distribution transformer). The inverter is further configured to determine the voltage of the received MVDC power, for example, to determine if a transient over- or under-voltage condition is occurring. If the determined voltage is less than a threshold input voltage, the inverter is configured to transmit the MVAC power at an AC power level less than a rated AC output power level of the inverter. In other words, while the inverter is configured to operate at the rated DC output power level under normal conditions, the inverter may operate at a reduced DC to DC output power level during under-voltage conditions to stabilize and/or increase the MVDC voltage. Accordingly, by controlling the DC to DC converters and inverters based on the MVDC voltage, the solar power generation system can regulate the MVDC bus voltage quickly and without any external lines of communication.

FIG. 1 illustrates an example solar power generation system 100. Solar power generation system 100 includes a plurality of PV arrays 102, a plurality of DC to DC converters 104, a plurality of branch MVDC busses 106, a main MVDC bus 108, one or more inverters 110, a distribution transformer 112, and an energy storage system 114.

PV arrays 102 each include one or more PV panels configured to produce LVDC power from, for example, solar radiation. In some embodiments, PV arrays 102 generate and output DC power at a bipolar voltage level of, for example, about ±1.5 kilovolts. Alternatively, in some embodiments, DC power output by PV arrays 102 is unipolar.

DC to DC converters 104 receive the LVDC power produced by PV arrays 102 and are configured to convert the LVDC power output by PV arrays 102 to MVDC power. For example, when LVDC power is received from PV arrays 102, DC to DC converters output DC power at a bipolar voltage level in a range of about ±10 kilovolts to about ±40 kilovolts, for example. Each DC to DC converter 104 is electrically coupled to at least one PV array 102. Each DC to DC converter 104 has a power capacity sufficient to handle the collective LVDC power received from each PV array 102 coupled thereto. In some embodiments, each DC to DC converter 104 has a power in a range of about 100 kilowatts to about 500 kilowatts.

Branch MVDC busses 106 convey MVDC power output by DC to DC converters 104 to main MVDC bus 108. Each branch MVDC bus 106 is electrically coupled to and receives MVDC power from one or more DC to DC converters 104. Each MVDC bus is electrically coupled to main MVDC bus 108 via a diode 116, which enables current to flow from branch MVDC busses 106 to main MVDC bus 108, but prevents a reverse flow of current from main MVDC bus 108 to DC to DC converters 104.

Main MVDC bus 108 receives MVDC power from each DC to DC converter 104 via branch MVDC busses 106. Main MVDC bus 108 is electrically coupled to one or more inverters 110, which receive MVDC power from main MVDC bus 108 and convert the MVDC power to MVAC power. Each inverter 110 is in turn electrically coupled to distribution transformer 112, which converts the MVAC power output by inverters 110 to AC power of a voltage level (e.g., high voltage) suitable for transmission to an electrical grid and/or load. Because AC power transmission generally results in at least some reactive power losses, by utilizing DC power transmission within solar power generation system 100, such reactive power losses may be reduced compared to systems that, for example, use AC power transmission to convey power from local inverter hubs to a point of interconnection (POI). Additionally, a current requirement is reduced by utilizing DC power transmission, which further reduces power losses. Further, DC to DC converters 104 may be cheaper to produce and install than the local inverter hubs of systems utilizing MVAC power transmission.

Energy storage system 114 is configured to store electrical energy generated by PV arrays 102. For example, energy storage system 114 may store electrical energy when PV arrays 102 are generating power (e.g., during the day or sunny conditions) and output power when PV arrays 102 are not generating power (e.g., during the night or cloudy conditions), in order to maintain a consistent power output of solar power generation system 100. Energy storage system may be, for example, a battery energy storage system (BESS) including one or more battery elements and/or other components for storing electrical energy received via, for example, main MVDC bus 108 and supplying stored energy back through main MVDC bus 108. In some embodiments, energy storage system 114 includes a DC to DC converter 118, and is electrically coupled to main MVDC bus 108 via DC to DC converter 118. DC to DC converter 118 is configured to convert MVDC power supplied from main MVDC bus 108 to a power suitable for supplying to energy storage system 114, and to convert power supplied by energy storage system 114 to MVDC power. Additionally, DC to DC converter 118 may reduce fault currents present in main MVDC bus 108 and may provide an additional layer of control available for operators of solar power generation system 200. While energy storage system 114 is shown in FIG. 1 as coupled to main MVDC bus 108, in alternative embodiments, energy storage system 114 may be coupled to another component of solar power generation system 100, such as one of branch MVDC busses 106.

As described above, DC to DC converter 104 is configured to convert LVDC power received from at least one PV array 102 MVDC power. DC to DC converter 104 is configured to transmit this DC power (e.g., via branch MVDC bus 106) according to an output power setpoint, which may be altered by DC to DC converter in order to respond to, for example, over- or under-voltage conditions in branch MVDC bus 106. To determine the output power setpoint, DC to DC converter 104 is configured to determine a voltage of branch MVDC bus 106. Under normal conditions (e.g., with no over-voltage), DC to DC converter may 104 operate at a predefined rated DC output power level. If the determined voltage exceeds a threshold output voltage (i.e., an over-voltage condition is present), DC to DC converter 104 is configured to adjust the output power setpoint so that MVDC power is transmitted via branch MVDC bus 106 at a DC power level less than the rated DC output power level of DC to DC converter 104. By reducing the output power setpoint of DC to DC converter 104, the voltage of branch MVDC bus 106 may be reduced. Because each DC to DC converter 104 is controlled independently and similarly, DC to DC converters 104 may adjust their respective output power setpoints simultaneously to address over-voltage conditions without a need for communication infrastructure between DC to DC converters 104. Further, because this adjustment is made based on a measurement of the MVDC voltage, no system-level controller or related communication infrastructure is needed for controlling DC to DC converters 104.

As described above, inverter 110 is configured to receive MVDC power (e.g., via main MVDC bus 108) and convert the MVDC power to MVAC power. Like DC to DC converters 104, inverters 110 are configured to transmit this AC power according to an output power setpoint. To determine the output power setpoint, inverter 110 is configured to determine a voltage of main MVDC bus 108. Under normal conditions (e.g., with no under-voltage), inverter 110 may operate at a predefined rated AC output power level. If the determined voltage is less than a threshold input voltage (i.e., an under-voltage condition is present), inverter 110 is configured to adjust the output power setpoint so that MVAC power is transmitted at an AC power level less than the rated AC output power level of inverter 110. Because each inverter 110 is controlled independently and similarly, inverters 110 may adjust their respective output power setpoints simultaneously to address under-voltage conditions without a need for communication infrastructure between inverters 110 and/or between inverters 110 and DC to DC converters 104. Further, because this adjustment is made based on a measurement of the MVDC voltage, no system-level controller or related communication infrastructure is needed for controlling inverters 110.

In some embodiments, inverter 110 may receive a curtailment signal (e.g., from a grid or transmission system operator) indicating that an output power of solar power generation system 100 is required to be limited. In response to receiving the curtailment signal, inverter 110 is configured to reduce its output power. In some such embodiments, inverter 110 reduces the output power gradually overtime at a predefined rate referred to as a ramp rate. Such a reduction in output power may result in an increase in the MVDC voltage, due to the power output by DC to DC converter 104 exceeding that output by inverters 110. Accordingly, DC to DC converters 104 are configured to respond, as described above, to this increase in MVDC voltage by reducing the DC output power setpoint.

Energy storage system 114 also operates to reduce over- or under-voltage conditions. When the MVDC voltage (e.g., of main MVDC bus 108 or branch MVDC bus 106) is greater than a nominal operating DC voltage of main MVDC bus 108 or branch MVDC bus 106, energy storage system 114 is configured to store MVDC power, thereby reducing the MVDC voltage. Conversely, when the MVDC voltage is less than the nominal operating DC voltage, energy storage system 114 is configured to output MVDC power, thereby increasing the MVDC voltage. Energy storage system may store or output MVDC power to address over- or under-voltage conditions simultaneously with output power setpoint adjustment of DC to DC converters 104 and/or inverters 110 as described above. Because the determination to store or output MVDC power is made by energy storage system 114 based on a measurement of the MVDC voltage, no system-level controller or related communication infrastructure is needed for controlling energy storage system 114.

Figure 2:
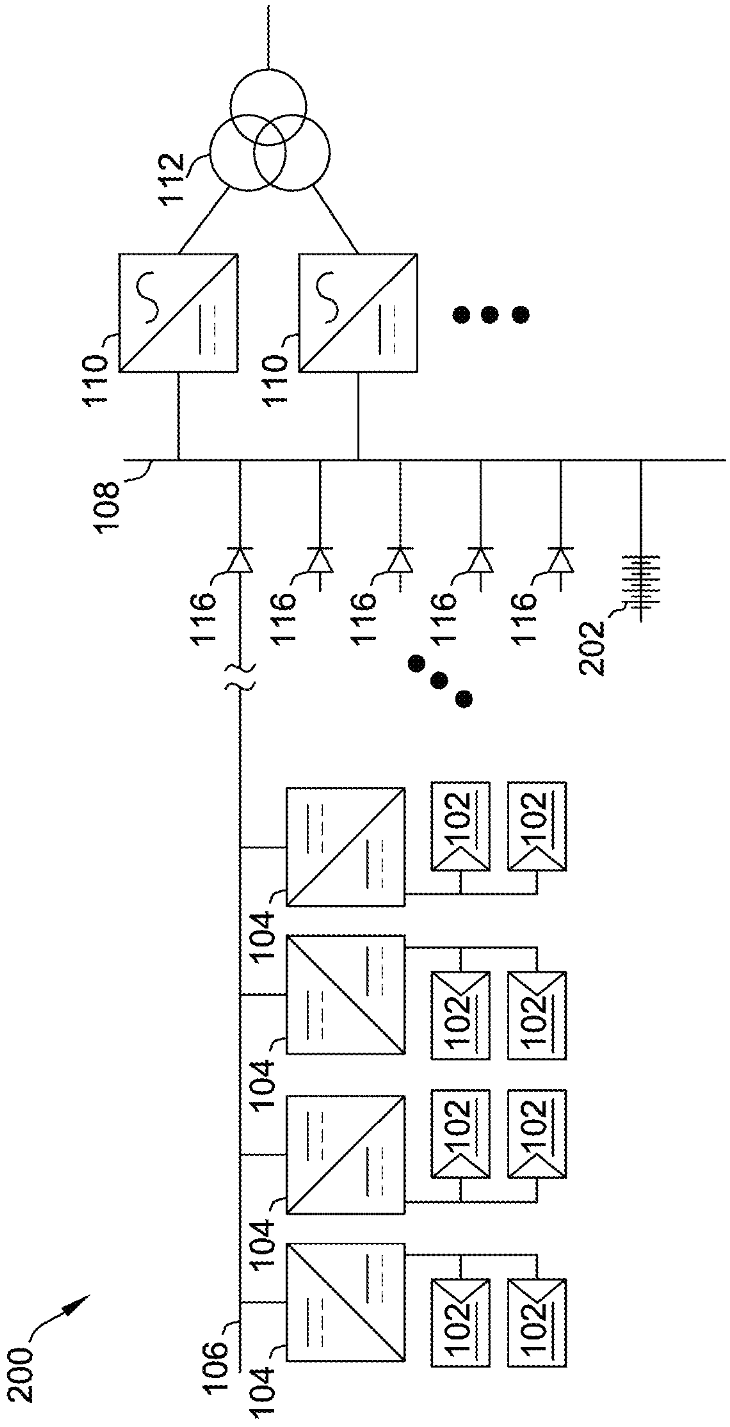
FIG. 2 is a diagram of another example solar power generation system.

FIG. 2 illustrates another example solar power generation system 200. Solar power generation system 200 includes PV arrays 102, DC to DC converters 104, branch MVDC busses 106, main MVDC bus 108, inverters 110, distribution transformer 112, and energy storage system 114, which generally function as described with respect to solar power generation system 100 (shown in FIG. 1). As shown in FIG. 2, in some embodiments, energy storage system 114 is coupled directly to main MVDC bus 108 without an intermediate converter such as DC to DC converter 118, which may result in decreased component costs, gains in energy efficiency, and improvement in system stability during transient conditions.

Figure 3:
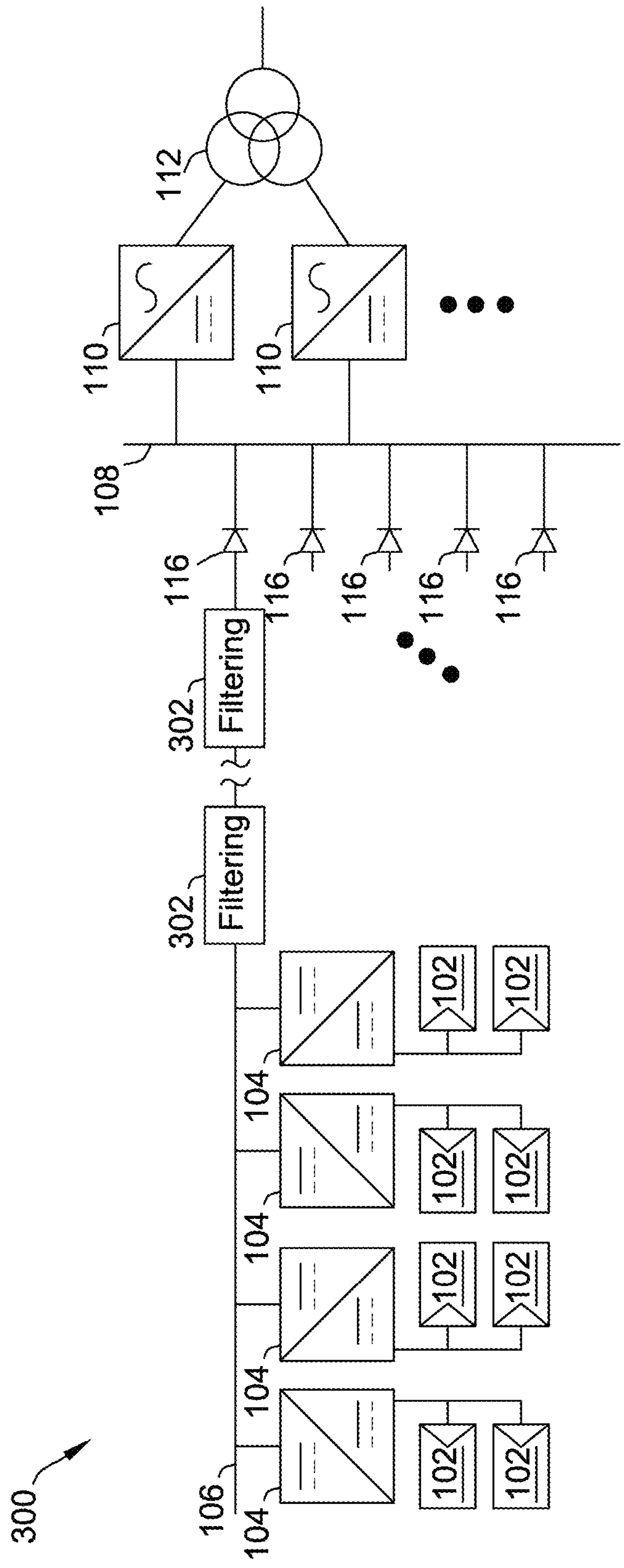
FIG. 3 is a diagram of another example solar power generation system.

FIG. 3 illustrates another example solar power generation system 300. Solar power generation system 300 includes PV arrays 102, DC to DC converters 104, branch MVDC busses 106, main MVDC bus 108, inverters 110, distribution transformer 112, and energy storage system 114, which generally function as described with respect to solar power generation system 100 (shown in FIG. 1). Solar power generation system 300 further includes at least one filter 302 electrically coupled between branch MVDC bus 106 and main MVDC bus 108. Filters 302 are configured to filter high frequency components from branch MVDC busses 106, such as those that may result from high frequency switching. Accordingly, filters 302 reduce undesirable voltage reflections within branch MVDC busses 106.

Figure 4A:
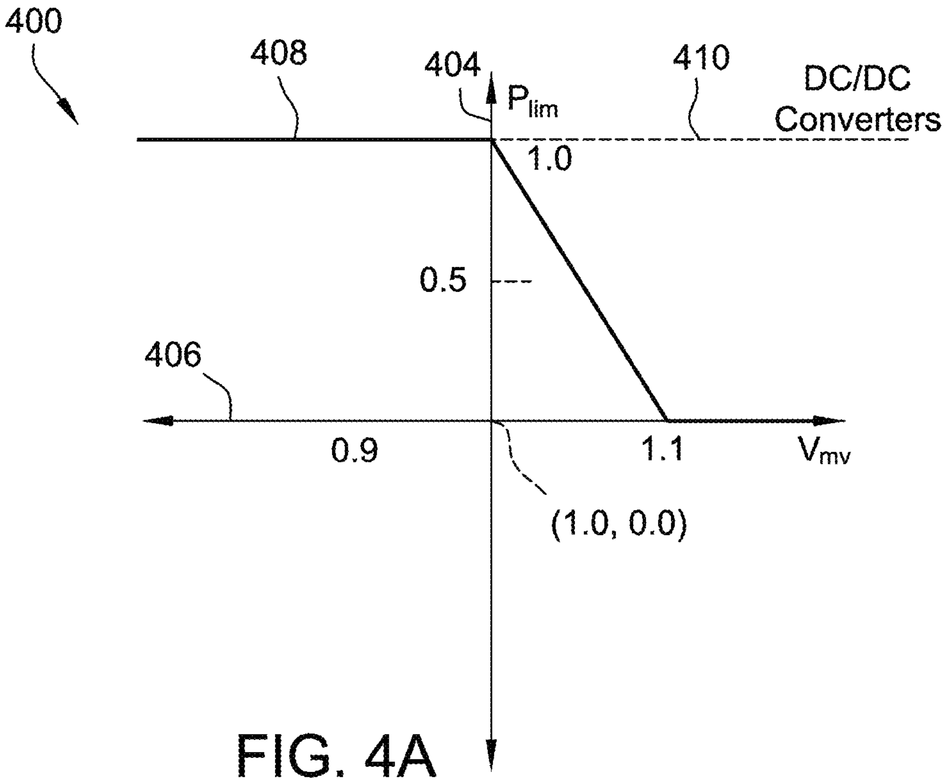
FIG. 4A is a graph illustrating an example relationship between a power setpoint and a measured voltage for a direct current (DC) to DC converter.
Figure 4B:
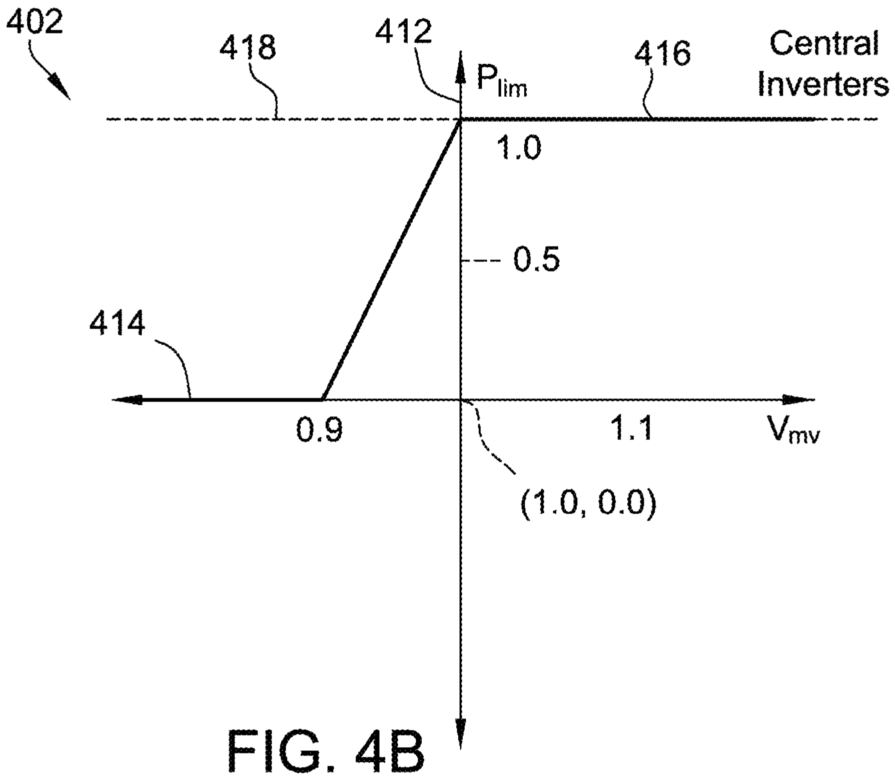
FIG. 4B is a graph illustrating an example relationship between a power setpoint and a measured voltage for an inverter.

FIG. 4A depicts a graph 400 illustrating an example relationship for controlling an output power setpoint of a DC to DC converter such as DC to DC converter 104 based on a measured MVDC voltage. FIG. 4B depicts a graph 402 illustrating an example relationship for controlling an output power setpoint of an inverter such as inverter 110 based on a measured MVDC voltage.

Graph 400 includes a vertical axis 404, a horizontal axis 406, and a DC power setpoint curve 408. Vertical axis 404 represents an output power setpoint of DC to DC converter 104 expressed as a dimensionless percentage of a rated DC power output level 410 of DC to DC converter 104. Horizontal axis 406 represents an MVDC voltage represented as a dimensionless percentage of a nominal MVDC voltage. As illustrated by DC power setpoint curve 408, when the MVDC voltage is less than or equal to a threshold (e.g., the nominal MVDC voltage), DC to DC converter 104 operates at rated DC power output level 410. When the MVDC voltage is greater than the threshold, DC to DC converter 104 operates at a DC output power level less than rated DC power output level 410. For example, as shown by graph 400, the DC output power setpoint may be decreased linearly as the MVDC voltage increases above the threshold until the DC output power setpoint reaches zero (e.g., at a voltage level equal to the threshold multiplied by a factor of 1.1).

Graph 402 includes a vertical axis 412, a horizontal axis 414, and an AC power setpoint curve 416. Vertical axis 412 represents an output power setpoint of inverter 110 expressed as a dimensionless percentage of a rated AC power output level 418 of inverter 110. Horizontal axis 406 represents an MVDC voltage represented as a dimensionless percentage of the nominal MVDC voltage. As illustrated by AC power setpoint curve 416, when the MVDC voltage is greater than or equal to a threshold (e.g., the nominal MVDC voltage), inverter operates at rated AC power output level 418. When the MVDC voltage is greater than the threshold, inverter 110 operates at an AC output power level less than rated AC power output level 418. For example, as shown by graph 402, the AC output power setpoint may be decreased linearly as the MVDC voltage decreases below the threshold until the AC output power setpoint reaches zero (e.g., at a voltage level equal to the threshold multiplied by a factor of 0.9).

Figure 5A:
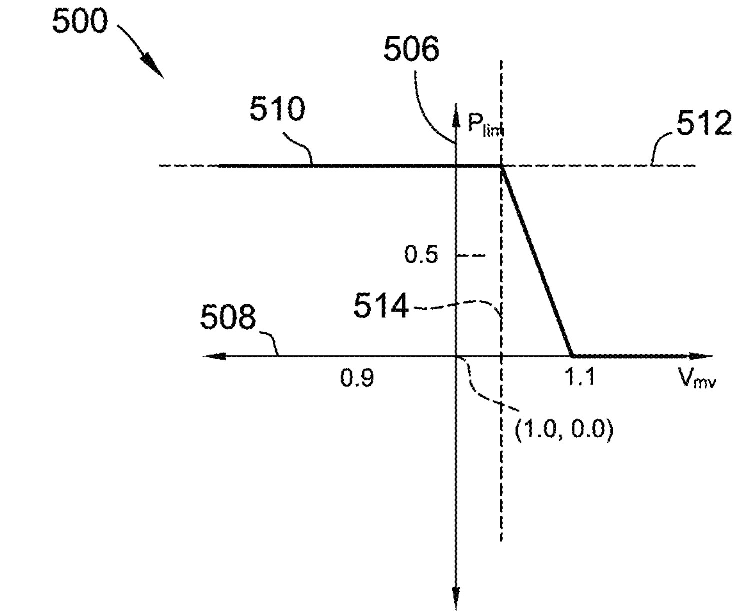
FIG. 5A is a graph illustrating another example relationship between a power setpoint and a measured voltage for a DC to DC converter.
Figure 5B:
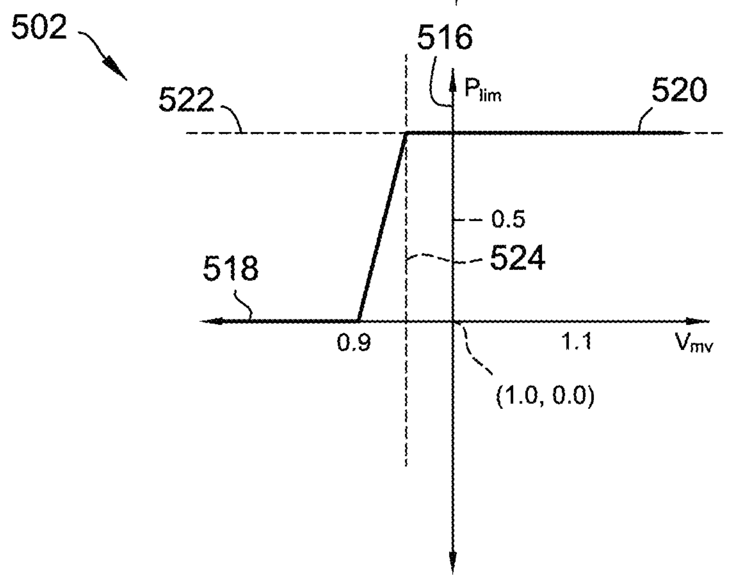
FIG. 5B is a graph illustrating another example relationship between a power setpoint and a measured voltage for an inverter.
Figure 5C:
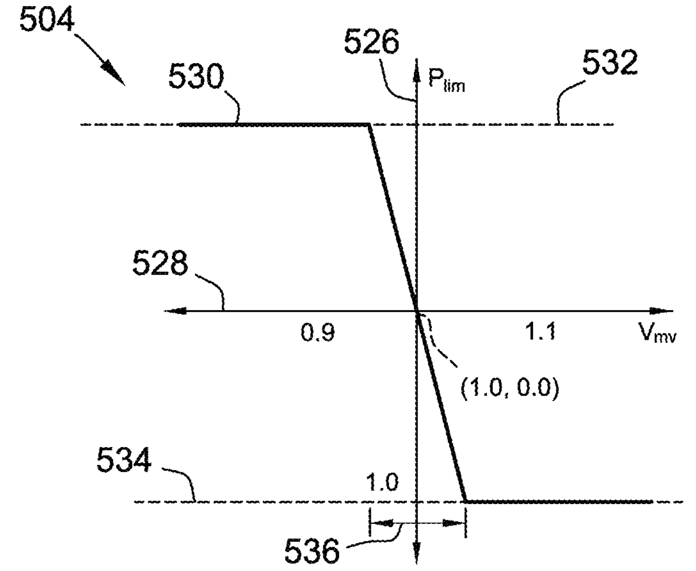
FIG. 5C is a graph illustrating an example relationship between a power setpoint and a measured voltage for an energy storage system.

FIG. 5A depicts a graph 500 illustrating another example relationship for controlling an output power setpoint of a DC to DC converter such as DC to DC converter 104 based on a measured MVDC voltage. FIG. 5B depicts a graph 502 illustrating another example relationship for controlling an output power setpoint of an inverter such as inverter 110 based on a measured MVDC voltage. FIG. 5C depicts a graph 504 illustrating an example relationship for controlling a power input and output setpoint for an energy storage system such as energy storage system 114 based on a measured MVDC voltage.

Graph 500 includes a vertical axis 506, a horizontal axis 508, and a DC power setpoint curve 510. Vertical axis 506 represents an output power setpoint of DC to DC converter 104 expressed as a dimensionless percentage of a rated DC power output level 512 of DC to DC converter 104. Horizontal axis 508 represents an MVDC voltage represented as a dimensionless percentage of a nominal MVDC voltage. As illustrated by DC power setpoint curve 510, when the MVDC voltage is less than or equal to a threshold voltage 514, DC to DC converter 104 operates at rated DC power output level 512. In contrast to the example illustrated by graph 400 in FIG. 4A, threshold voltage 514 is greater than the nominal MVDC voltage, to account for an ability of energy storage system 114 to store excess power during over-voltage conditions. When the MVDC voltage is greater than threshold voltage 514, DC to DC converter 104 operates at a DC output power level less than rated DC power output level 512. For example, as shown by graph 500, the DC output power setpoint may be decreased linearly as the MVDC voltage increases above the threshold until the DC output power setpoint reaches zero (e.g., at a voltage level equal to the threshold multiplied by a factor of 1.1).

Graph 502 includes a vertical axis 516, a horizontal axis 518, and an AC power setpoint curve 520. Vertical axis 516 represents an output power setpoint of inverter 110 expressed as a dimensionless percentage of a rated AC power output level 522 of inverter 110. Horizontal axis 518 represents an MVDC voltage represented as a dimensionless percentage of the nominal MVDC voltage. As illustrated by AC power setpoint curve 520, when the MVDC voltage is greater than or equal to a threshold voltage 524, inverter 110 operates at rated AC power output level 522. In contrast to the example illustrated by graph 402 in FIG. 4B, threshold voltage 524 is less than the nominal MVDC voltage, to account for an ability of energy storage system 114 to provide power during under-voltage conditions. When the MVDC voltage is greater than threshold voltage 524, inverter 110 operates at an AC output power level less than rated AC power output level 522. For example, as shown by graph 502, the AC output power setpoint may be decreased linearly as the MVDC voltage decreases below the threshold until the AC output power setpoint reaches zero (e.g., at a voltage level equal to the threshold multiplied by a factor of 0.9).

Graph 504 includes a vertical axis 526, a horizontal axis 528, and a power setpoint curve 530. Vertical axis 516 represents a power setpoint of energy storage system 114 expressed as a dimensionless percentage of a maximum output power 532 of energy storage system 114. Positive values along vertical axis 526 represent power output by energy storage system, while negative values along vertical axis 526, including maximum input power 534, represent power input to energy storage system 114. Horizontal axis 518 represents an MVDC voltage represented as a dimensionless percentage of the nominal MVDC voltage. As illustrated by power setpoint curve 530, when the MVDC voltage level is at the nominal MVDC voltage, energy storage system 114 does not input or output power. If the MVDC voltage is less than the nominal MVDC voltage, energy storage system 114 outputs power to increase the MVDC voltage, while if the MVDC voltage is greater than the MVDC voltage, energy storage system 114 stores power to decrease the MVDC voltage. When the MVDC voltage falls within a hysteresis band between threshold voltage 514 and threshold voltage 524, both DC to DC converter 104 and inverter 110 operate at their respective rated output power, while energy storage system stores or outputs power to pull the MVDC voltage towards the nominal MVDC voltage.

Figure 6:
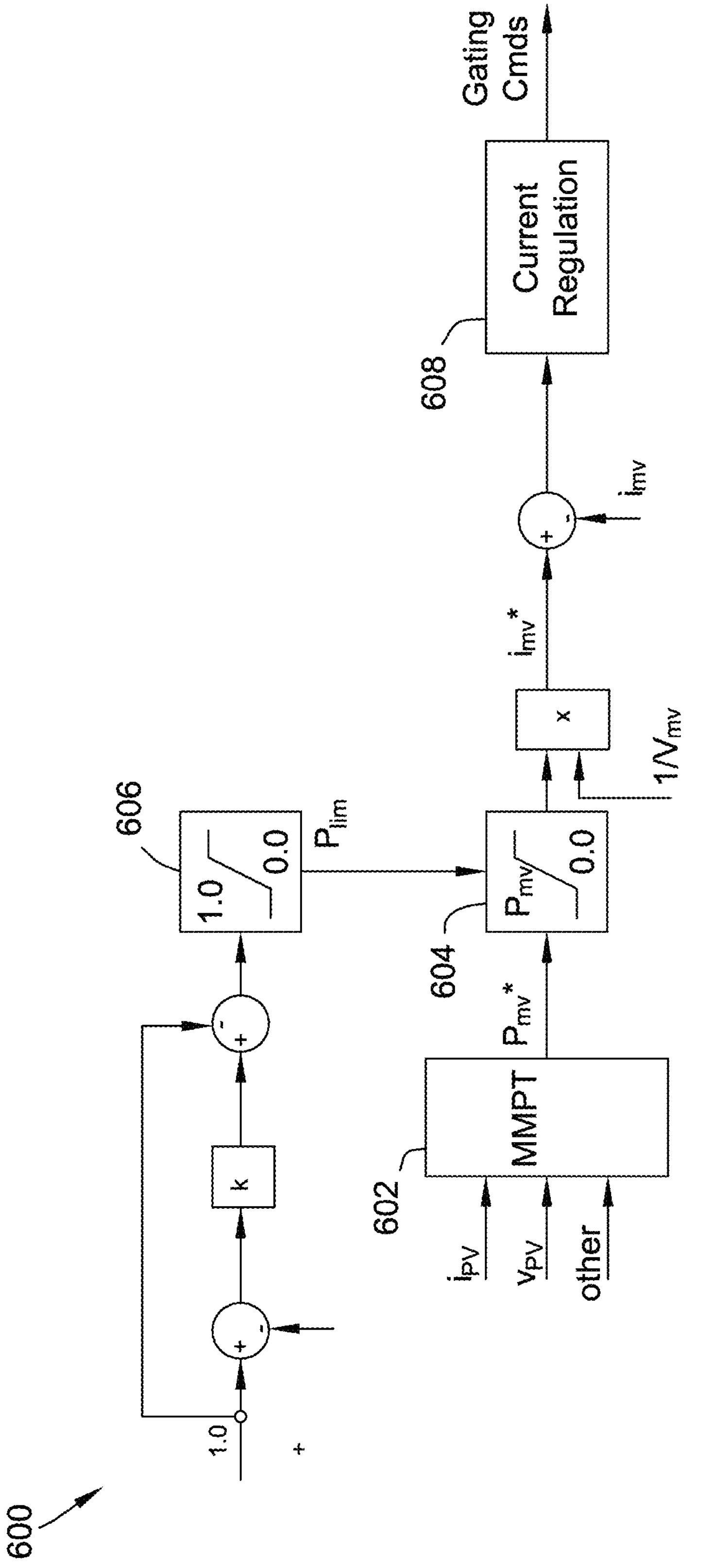
FIG. 6 is a block diagram representing an example controller for controlling a DC to DC converter.

FIG. 6 is a block diagram representing an example controller 600 for controlling a DC to DC converter such as DC to DC converter 104 (shown in FIG. 1). Controller 600 includes a maximum power point tracking (MPPT) module 602, which is configured to apply an MPPT algorithm to determine a power command ($P_{mv}$*) for DC to DC converter 104 to output based on, for example, a current ($i_{pv}$) and voltage ($v_{pv}$) output by PV arrays 102 and/or other parameters. A clamp 604 is applied to power command ($P_{mv}$*) to limit power ($P_{mv}$*) to a power limitation ($P_{lim}$). Power limitation ($P_{lim}$) is determined, as described above, by applying a clamp 606 based on a measured MVDC voltage ($v_{mv}$). A current command ($i_{mv}$*) is determined based on the limited power command and MVDC voltage ($v_{mv}$), and a current regulation module 608 determines gating commands for DC to DC converter 104 based on current command ($i_{mv}$*) and a measured MVDC current ($i_{mv}$).

Figure 7:
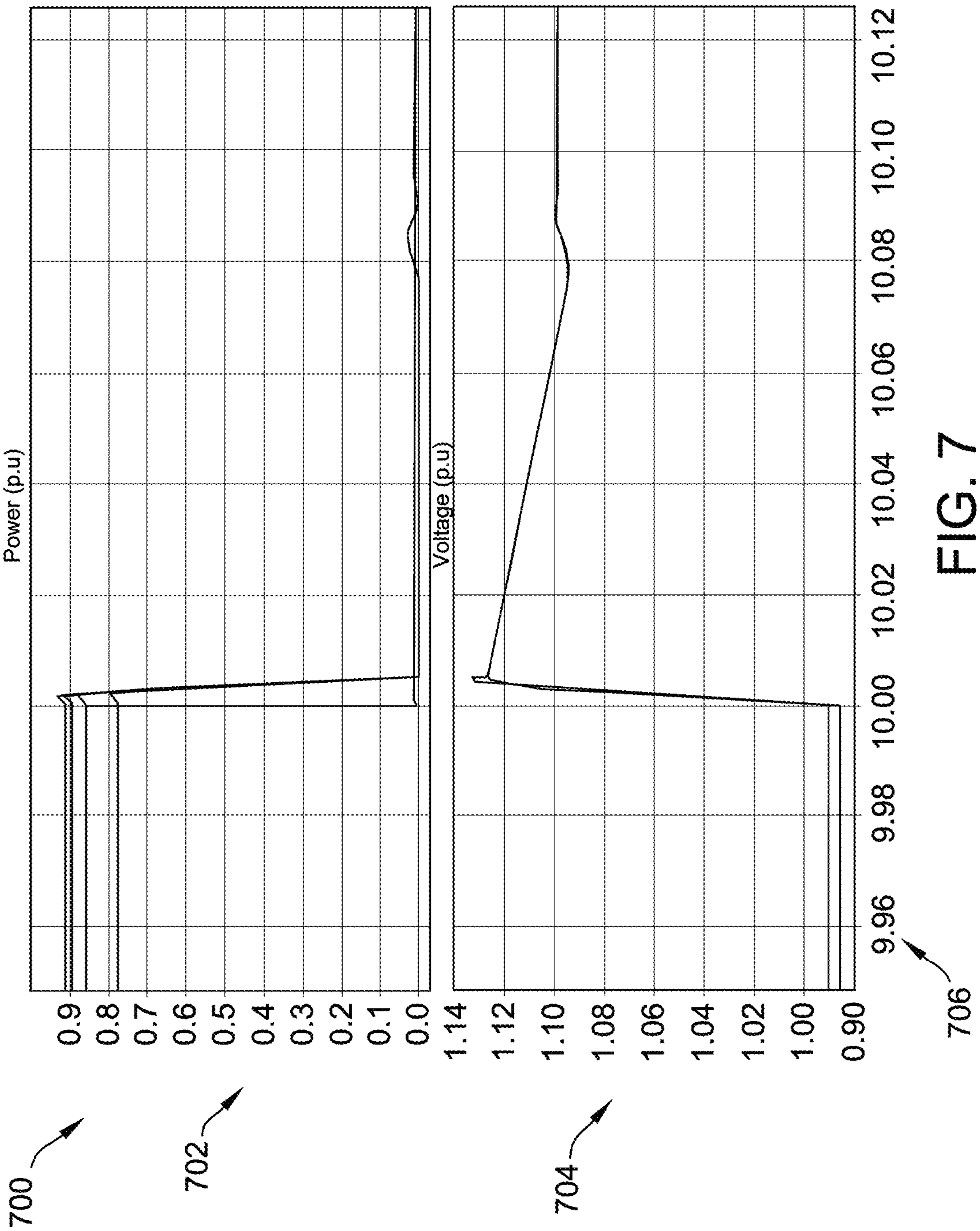
FIG. 7 is a graph illustrating an example simulated DC output power and medium voltage DC bus voltage during a fault event.

FIG. 7 depicts a graph 700 illustrating an example simulated DC output power and MVDC bus voltage during a fault event. Graph 700 includes a first vertical axis 702 representing a simulated DC output power for a plurality of DC to DC converters 104 expressed as a dimensionless percentage of a nominal DC output power. Graph 700 further includes a second vertical axis 704 representing a simulated MVDC voltage expressed as a dimensionless percentage of a nominal MVDC voltage. Graph 700 further includes a horizontal axis 706 representing time elapsed expressed in seconds.

As shown in graph 700, at a time elapsed of 10 seconds, a fault occurs that prevents power from being output by solar power generation system 100, resulting in a transient overvoltage. This overvoltage is illustrated by the increase in MVDC voltage occurring after 10 seconds have elapsed. In response to the overvoltage, DC to DC converters 104 reduce their respective DC power outputs, as illustrated by the decrease in simulated DC output power occurring after 10 seconds have elapsed. Due to this decreasing of the DC output power of DC to DC converters 104, the MVDC voltage levels off and remains substantially constant, albeit at a higher voltage level.

Figure 8:
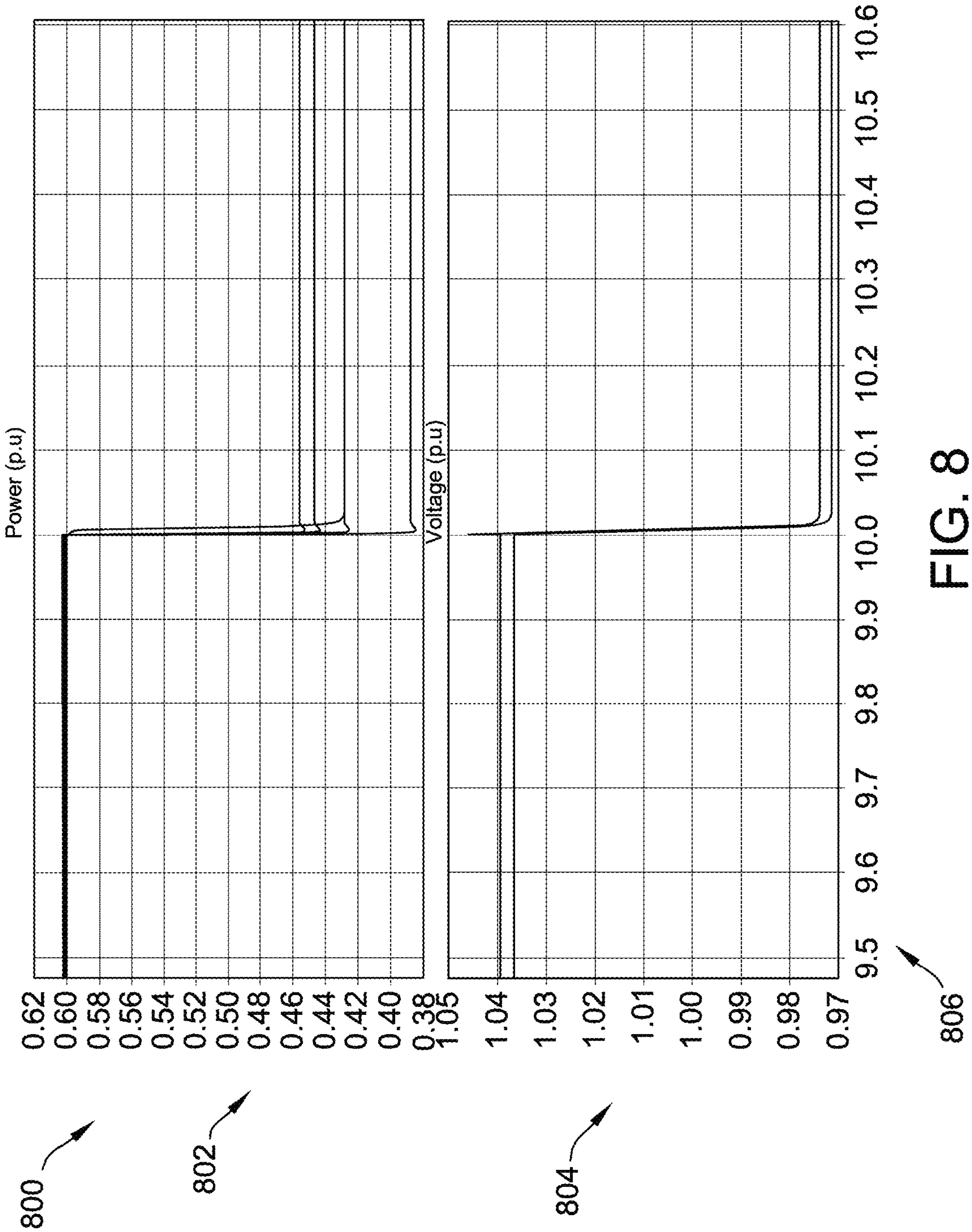
FIG. 8 is a graph illustrating an example simulated alternating current (AC) output power and medium voltage DC bus voltage during a reduction in irradiance resulting in reduced output power of photovoltaic arrays.

FIG. 8 depicts a graph 800 illustrating an example simulated AC output power and MVDC bus voltage during a reduction in irradiance resulting in reduced output power of PV arrays 102. Graph 800 includes a first vertical axis 802 representing a simulated AC output power for a plurality of inverters 110 expressed as a dimensionless percentage of a nominal DC output power. Graph 800 further includes a second vertical axis 804 representing a simulated MVDC voltage expressed as a dimensionless percentage of a nominal MVDC voltage. Graph 800 further includes a horizontal axis 806 representing time elapsed expressed in seconds.

As shown in graph 800, at a time elapsed of 10 seconds, a reduction in irradiance occurs, resulting in a transient undervoltage. This undervoltage is illustrated by the decrease in MVDC voltage occurring after 10 seconds have elapsed. In response to the overvoltage, inverters 110 reduce their respective AC power outputs, as illustrated by the decrease in simulated AC output power occurring after 10 seconds have elapsed. Due to this decreasing of the AC output power of inverters 110, the MVDC voltage levels off and remains substantially constant, albeit at a lower voltage level.

Figure 9:
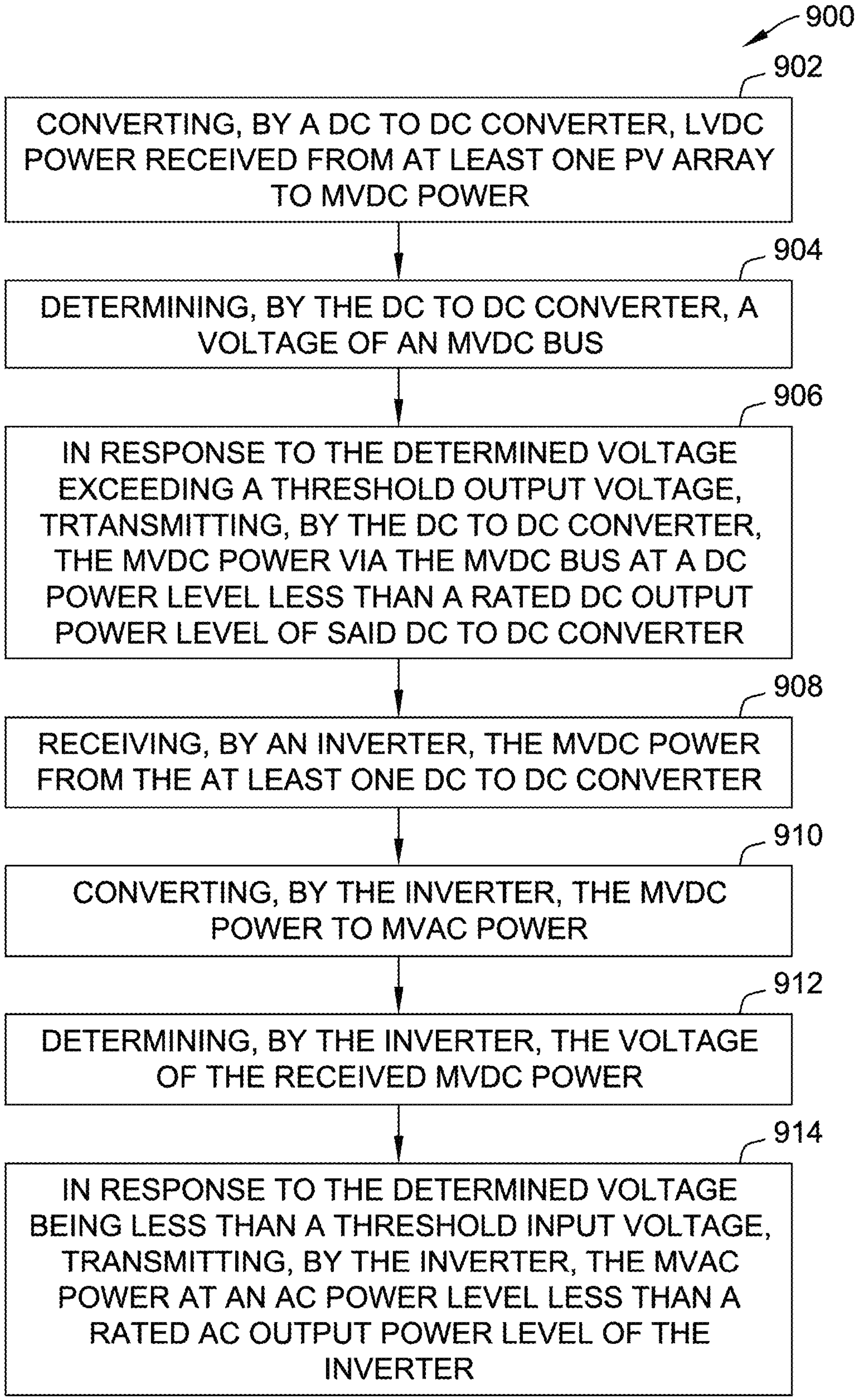
FIG. 9 is a flowchart of an example method for controlling a solar power generation system.

FIG. 9 is a flowchart illustrating an example method 900 for controlling a solar power generation system (such as solar power generation system 100 shown in FIG. 1).

Method 900 includes converting 902, by a DC to DC converter (such as DC to DC converter 104), LVDC power received from at least one PV array (such as PV arrays 102) to MVDC power. Method 900 further includes determining 904, by the DC to DC converter, a voltage of an MVDC bus (such as branch MVDC bus 106). Method 900 further includes, in response to the determined voltage exceeding a threshold output voltage, transmitting 906, by the DC to DC converter, the MVDC power via the MVDC bus at a DC power level less than a rated DC output power level of the DC to DC converter. Method 900 further includes receiving 908, by an inverter (such as inverter 110), the MVDC power from the at least one DC to DC converter. Method 900 further includes converting 910, by the inverter, the MVDC power to medium voltage MVAC power. Method 900 further includes determining 912, by the inverter, the voltage of the received MVDC power. Method 900 further includes, in response to the determined voltage being less than a threshold input voltage, transmitting 914, by the inverter, the MVAC power at an AC power level less than a rated AC output power level of the inverter.

In some embodiments, the solar power generation system further includes an energy storage system (such as energy storage system 114), and method 900 further includes storing, by the energy storage system, MVDC power received from the DC to DC converter when a voltage of the MVDC bus is greater than a nominal voltage and transmitting, by the energy storage system, MVDC power to the inverter when voltage of the MVDC bus is less than a nominal voltage.

In some embodiments, method 900 further includes, in response to the determined voltage being less than or equal to the threshold output voltage, transmitting, by the DC to DC converter the MVDC power via the MVDC bus at the rated DC output power level of the DC to DC converter.

In some embodiments, method 900 further includes, in response to the determined voltage being greater than or equal to the threshold input voltage, transmitting, by the inverter, the MVAC power at the rated AC output power level of the inverter.

In some embodiments, method 900 further includes determining, by the DC to DC converter, an MVDC power level for transmitting the DC power when the determined MVDC voltage exceeds the threshold input voltage based on a linear function.

In some embodiments, method 900 further includes determining, by the inverter, the AC power level for transmitting the MVAC power when the determined MVDC voltage is less than the threshold input voltage based on a linear function.

In some embodiments, method 900 further includes receiving, by the inverter, a curtailment signal and determining, by the inverter, the AC power level at which to transmit MVAC power further based on the curtailment signal.

In some embodiments, method 900 further includes generating, by the DC to DC converter, a power command based on a maximum power point tracking algorithm and determining, by the DC to DC converter, the DC power level at which to transmit MVDC power based in part on the generated power command.

In some embodiments, the rated DC output power level is in a range of about 100 kilowatts to about 500 kilowatts.

An example technical effect of the methods, systems, and apparatus described herein includes at least one of: (a) reducing overvoltage conditions in an MVDC bus of a solar power distribution system by decreasing a rated power output of DC to DC converters coupled to the MVDC bus when a voltage of the MVDC bus exceeding a threshold output voltage; and (b) reducing undervoltage conditions in an MVDC bus of a solar power distribution system by reducing an AC output power of an inverter coupled to the MVDC bus when the voltage of the MVDC bus less that a threshold input voltage.

Example embodiments of a solar power generation system are provided herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiments can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above embodiments are examples only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A solar power generation system comprising:

at least one photovoltaic (PV) array configured to generate low voltage direct current (LVDC) power;

at least one DC to DC converter electrically coupled to a medium voltage DC (MVDC) bus, said DC to DC converter configured to:

convert LVDC power received from the at least one PV array to MVDC power;

determine a voltage of the MVDC bus; and in response to the determined voltage of the MVDC bus exceeding a threshold output voltage, transmit the MVDC power via the MVDC bus at a DC power level less than a rated DC output power level of said at least one DC to DC converter;

at least one inverter configured to:

receive the MVDC power from the at least one DC to DC converter;

convert the MVDC power to medium voltage AC (MVAC) power;

determine the voltage of the received MVDC power; and in response to the determined voltage of the received MVDC power being less than a threshold input voltage, transmit the MVAC power at an AC power level less than a rated AC output power level of said at least one inverter; and an energy storage system configured to:

operate at a maximum storage setpoint to store MVDC power received from said at least one DC to DC converter when a voltage of the MVDC bus is greater than the threshold output voltage of said at least one DC to DC converter;

operate at a maximum transmission setpoint to transmit MVDC power to said at least one inverter when the voltage of the MVDC bus is less than the threshold input voltage of said at least one inverter; and operate at a variable setpoint that varies between the maximum storage setpoint and the maximum transmission setpoint when the voltage of the MVDC bus is between the threshold output voltage of said at least one DC to DC converter and the threshold input voltage of said at least one inverter.

2. The solar power generation system of claim 1, wherein said at least one DC to DC converter is further configured to, in response to the determined voltage of the MVDC bus being less than or equal to the threshold output voltage, transmit the MVDC power via the MVDC bus at the rated DC output power level of said DC to DC converter.

3. The solar power generation system of claim 1, wherein said at least one inverter is further configured to, in response to the determined voltage of the received MVDC power being greater than or equal to the threshold input voltage, transmit the MVAC power at the rated AC output power level of said inverter.

4. The solar power generation system of claim 1, wherein said at least one DC to DC converter is further configured to determine an MVDC power level for transmitting the DC power when the determined voltage of the MVDC bus exceeds the threshold input voltage based on a linear function such that the MVDC power level varies linearly with respect to the determined voltage of the MVDC bus.

5. The solar power generation system of claim 1, wherein said at least one inverter is further configured to determine the AC power level for transmitting the MVAC power when the determined voltage of the received MVDC power is less than the threshold input voltage based on a linear function such that the AC power level varies linearly with respect to the determined voltage of the received MVDC power.

6. The solar power generation system of claim 1, wherein said at least one inverter is configured to:

receive a curtailment signal; and determine the AC power level at which to transmit MVAC power further based on the curtailment signal.

7. The solar power generation system of claim 1, wherein said at least one DC to DC converter is configured to:

generate a power command based on a maximum power point tracking algorithm; and determine the DC power level at which to transmit MVDC power based in part on the generated power command.

8. The solar power generation system of claim 1, wherein the rated DC output power level is in a range from 100 kilowatts to 500 kilowatts.

9. A method for controlling a solar power generation system, the solar power generation system including at least one direct current (DC) to DC converter, at least one inverter, and an energy storage system, the at least one DC to DC converter electrically coupled to a medium voltage DC (MVDC) bus, said method comprising:

converting, by the at least one DC to DC converter, low voltage DC (LVDC) power received from at least one photovoltaic (PV) array to MVDC power;

determining, by the at least one DC to DC converter, a voltage of the MVDC bus;

in response to the determined voltage of the MVDC bus exceeding a threshold output voltage, transmitting, by the at least one DC to DC converter, the MVDC power via the MVDC bus at a DC power level less than a rated DC output power level of the at least one DC to DC converter;

receiving, by the inverter, the MVDC power from the at least one DC to DC converter;

converting, by the inverter, the MVDC power to medium voltage AC (MVAC) power;

determining, by the inverter, the voltage of the received MVDC power;

in response to the determined voltage of the received MVDC power being less than a threshold input voltage, transmitting, by the inverter, the MVAC power at an AC power level less than a rated AC output power level of the inverter;

operating the energy storage system at a maximum storage setpoint to store MVDC power received from said at least one DC to DC converter when a voltage of the MVDC bus is greater than the threshold output voltage of said at least one DC to DC converter;

operating the energy storage system at a maximum transmission setpoint to transmit MVDC power to said at least one inverter when the voltage of the MVDC bus is less than the threshold input voltage of said at least one inverter; and operating the energy storage system at a variable setpoint that varies between the maximum storage setpoint and the maximum transmission setpoint when the voltage of the MVDC bus is between the threshold output voltage of said at least one DC to DC converter and the threshold input voltage of said at least one inverter.

10. The method of claim 9, further comprising, in response to the determined voltage of the MVDC bus being less than or equal to the threshold output voltage, transmitting, by the at least one DC to DC converter the MVDC power via the MVDC bus at the rated DC output power level of the DC to DC converter.

11. The method of claim 9, further comprising, in response to the determined voltage of the received MVDC power being greater than or equal to the threshold input voltage, transmitting, by the inverter, the MVAC power at the rated AC output power level of the inverter.

12. The method of claim 9, further comprising determining, by the at least one DC to DC converter, an MVDC power level for transmitting the DC power when the determined voltage of the MVDC bus exceeds the threshold input voltage based on a linear function such that the MVDC power level varies linearly with respect to the determined voltage of the MVDC bus.

13. The method of claim 9, further comprising determining, by the inverter, the AC power level for transmitting the MVAC power when the determined voltage of the MVDC power is less than the threshold input voltage based on a linear function such that the AC power level varies linearly with respect to the determined voltage of the received MVDC power.

14. The method of claim 9, further comprising:

receiving, by the inverter, a curtailment signal; and determining, by the inverter, the AC power level at which to transmit MVAC power further based on the curtailment signal.

15. The method of claim 9, further comprising:

generating, by the at least one DC to DC converter, a power command based on a maximum power point tracking algorithm; and determining, by the at least one DC to DC converter, the DC power level at which to transmit MVDC power based in part on the generated power command.

16. A solar power distribution system comprising:

at least one direct current (DC) to DC converter electrically coupled to a medium voltage DC (MVDC) bus, said DC to DC converter configured to:

convert low voltage DC (LVDC) power received from at least one photovoltaic (PV) array to MVDC power;

determine a voltage of the MVDC bus; and in response to the determined voltage of the MVDC bus exceeding a threshold output voltage, transmit the MVDC power via the MVDC bus at a DC power level less than a rated DC output power level of said at least one DC to DC converter;

at least one inverter configured to:

receive the MVDC power from the at least one DC to DC converter;

convert the MVDC power to medium voltage AC (MVAC) power;

determine the voltage of the received MVDC power; and in response to the determined voltage of the MVDC power being less than a threshold input voltage, transmit the MVAC power at an AC power level less than a rated AC output power level of said at least one inverter; and an energy storage system configured to:

operate at a maximum storage setpoint to store MVDC power received from said at least one DC to DC converter when a voltage of the MVDC bus is greater than the threshold output voltage of said at least one DC to DC converter;

operate at a maximum transmission setpoint to transmit MVDC power to said at least one inverter when the voltage of the MVDC bus is less than the threshold input voltage of said at least one inverter; and operate at a variable setpoint that varies between the maximum storage setpoint and the maximum transmission setpoint when the voltage of the MVDC bus is between the threshold output voltage of said at least one DC to DC converter and the threshold input voltage of said at least one inverter.

17. The solar power distribution system of claim 16, wherein said at least one DC to DC converter is further configured to, in response to the determined voltage of the MVDC bus being less than or equal to the threshold output voltage, transmit the MVDC power via the MVDC bus at the rated DC output power level of said DC to DC converter.

* * * * *